June 4, 1968 J. T. WATTERS Re. 26,399
APPARATUS FOR HANDLING FREIGHT CONTAINERS
Original Filed May 20, 1963 8 Sheets-Sheet 1
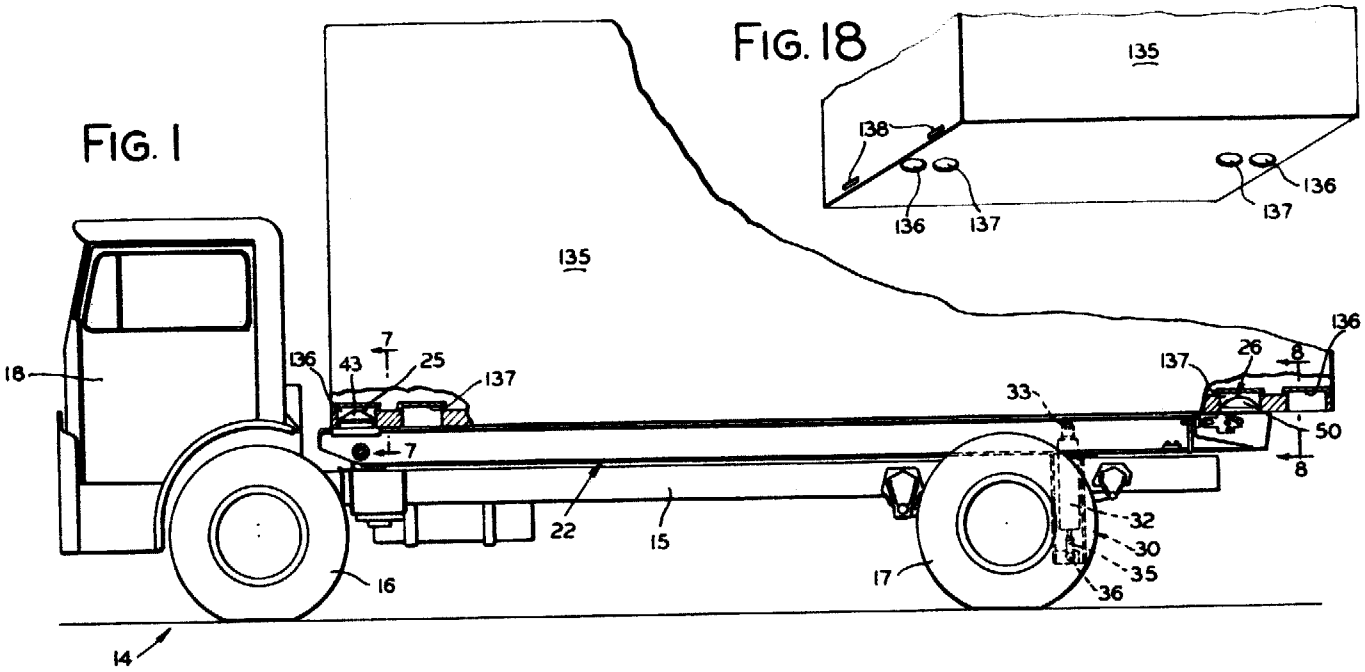
FIG. 18
FIG. 1
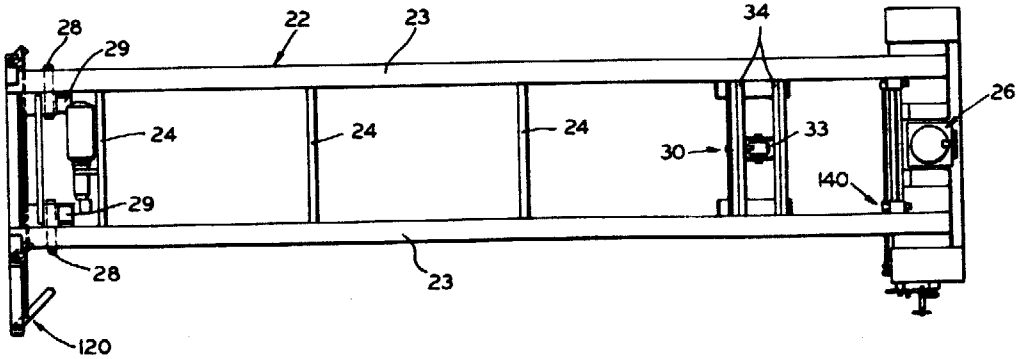
FIG. 2
INVENTOR
JOHNNY T. WATTERS
BY Owen, Jackson
Britton & Lucas
ATTORNEYS

APPARATUS FOR HANDLING FREIGHT CONTAINERS

Original Filed May 20, 1963 8 Sheets-Sheet 2

INVENTOR
JOHNNY T. WATTERS
BY Brown, Jackson, Boettcher & Dienner
ATTORNEYS

APPARATUS FOR HANDLING FREIGHT CONTAINERS

Original Filed May 20, 1963 8 Sheets-Sheet 3

INVENTOR
JOHNNY T. WATTERS
BY Brown Jackson Boettcher & Dienner
ATTORNEYS

APPARATUS FOR HANDLING FREIGHT CONTAINERS

Original Filed May 20, 1963 8 Sheets-Sheet 4

INVENTOR
JOHNNY T. WATTERS
BY Owen, Jackson & Berman
ATTORNEYS

APPARATUS FOR HANDLING FREIGHT CONTAINERS

Original Filed May 20, 1963 8 Sheets-Sheet 5

INVENTOR
JOHNNY T. WATTERS
BY Brown, Jackson, Boettcher & Dienner
ATTORNEYS

APPARATUS FOR HANDLING FREIGHT CONTAINERS
Original Filed May 20, 1963 8 Sheets-Sheet 6
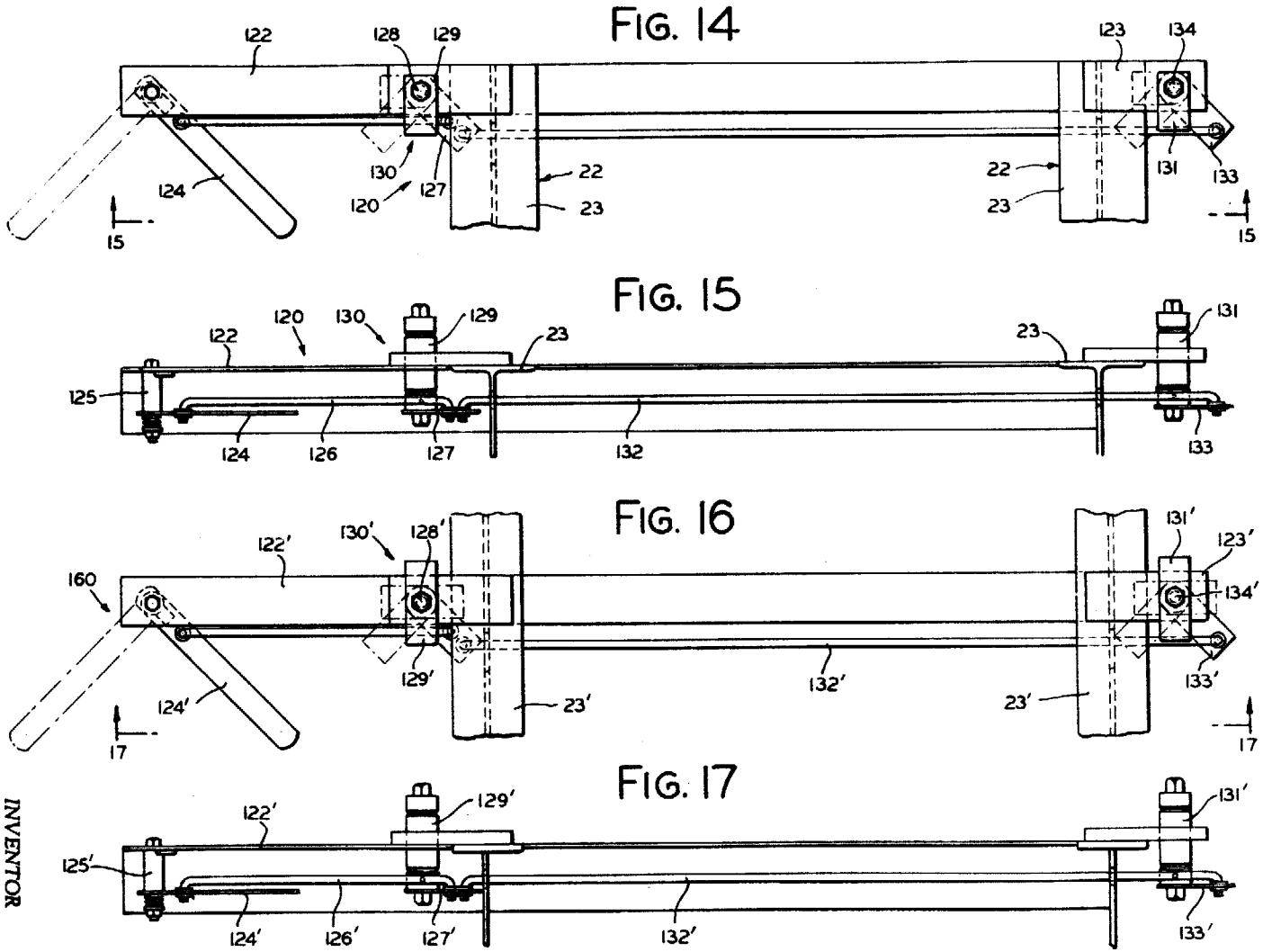
INVENTOR
JOHNNY T. WATTERS
BY Brown, Jackson, Boettcher & Dienner
ATTORNEYS

APPARATUS FOR HANDLING FREIGHT CONTAINERS

Original Filed May 20, 1963 8 Sheets-Sheet 7

INVENTOR
JOHNNY T. WATTERS
BY Brown, Jackson
Boettcher & Dienner
ATTORNEYS

APPARATUS FOR HANDLING FREIGHT CONTAINERS

Original Filed May 20, 1963 8 Sheets-Sheet 8

INVENTOR
JOHNNY T. WATTERS
BY Brown, Jackson, Boettcher & Dienner
ATTORNEYS

United States Patent Office

Re. 26,399
Reissued June 4, 1968

26,399

APPARATUS FOR HANDLING FREIGHT CONTAINERS

Johnny T. Watters, Battle Creek, Mich., assignor to Clark Equipment Company, a corporation of Michigan Original No. 3,188,042, dated June 8, 1965, Ser. No. 281,582, May 20, 1963. Application for reissue Apr. 28, 1967, Ser. No. 641,729

22 Claims. (Cl. 248—361)

Matter enclosed in heavy brackets [ ] appears in the original patent but forms no part of this reissue specification; matter printed in italics indicates the additions made by reissue.

*ABSTRACT OF THE DISCLOSURE*

*An apparatus including a load supporting surface for supporting a load in which a dome assembly mounted on the load supporting surface has a dome member extending above the load supporting surface for association with a load, in which the dome member has a latch nose opening through which the latch nose of latch means pivoted on said dome assembly is movable inwardly and outwardly, and in which the latch means is yieldingly biased to dispose the latch nose thereof outwardly of the latch nose opening of the dome.*

The present invention relates to improvements in apparatus for handling freight containers.

In the freight art, it is known that many advantages are obtainable in systems in which portable containers are used, for example, for packing, transporting, and storing goods. These containers may be of a wide variety of designs compatible with the goods to be handled, and are designed so that they may be readily mounted on or removed from a supporting structure, such as a transporting vehicle, loading or unloading docks, or storage facilities.

One form of such container and to which my present invention relates has its bottom wall formed with suitable apertures or recesses for receiving so-called dome members mounted on supporting structures of the character referred to. These dome members may be arranged in a variety of ways for the vehicles, docks and storage facilities. For example, in a vehicle a pair of domes are usually provided, one being movable fore and aft of the frame structure of the vehicle, and the other being rotatably mounted transversely of the vehicle frame to positions above and below a load or container supporting surface means of the vehicle into engaging and disengaging relation, respectively, with respect to dome recesses in the bottom wall of a freight container. In the position of a rotatable dome at which it lies below the supporting surface of the frame structure, the sliding dome may be positioned thereover for engaging with a dome recess in the bottom wall at one end of the container. With the sliding dome positioned away from the rotatable dome, the latter may be disposed to a position in which it extends above the supporting surface of the frame structure for engaging with a second dome recess in the bottom wall of and at the other end of a freight container. The general arrangement of sliding and rotatable domes as above discussed are known and as will be described hereinafter, provide, for example, for the convenient transfer of a freight container from a highway truck chassis of a so-called semi-trailer truck used to transport a pair of the containers over the road to a transfer truck for the local transporting of or delivery of a single freight container.

The present invention has to do with improvements in the aforementioned sliding and rotatable domes, the provision of new and novel means for restraining freight containers from vertical movement relative to structures on which they are supported, and to means for selectively preventing sliding movement of the sliding domes relative to the structures on which they are mounted.

An important object of the invention is to provide a new and novel rotatable dome assembly of the class referred to having a dome member adapted to be positioned above and below a load or container supporting surface means so as to be disposed in engaging and disengaging positions, respectively, with a dome recess in the bottom wall of a portable freight container.

A further object is to provide a rotatable dome assembly as last noted which is normally biased in a direction to dispose its dome member below the load or container supporting surface means.

A further object is to provide a rotatable dome assembly as last noted including means for retaining the same with its dome member in position extending above the load or container supporting surface means.

A further object is to provide a rotatable dome assembly having a dome member provided with latch means movable to latch engaging and disengaging positions with respect to the edge portion of the bottom wall at a dome recess in the latter.

A further object is to provide a rotatable dome assembly as last above noted in which the latch means of the dome member is normally yieldingly biased to its latch engaging position.

A further object is to provide a rotatable dome assembly embodying lock means for locking the aforementioned latch means selectively in either its latch engaging or disengaging position.

A further object is to provide spring means between the dome member and the aforementioned latch means for yieldingly biasing the latter toward its latch engaging position.

A further object is to provide spring means for the rotatable dome assembly for normally biasing the latter to a position at which the dome member thereof extends below the supporting surface means for the freight container.

A further object is to provide a new and novel sliding dome assembly and means for preventing movement of the same relative to the structure in which it is mounted.

A further object is to provide additional latch means for preventing vertical movement of a freight container relative to the load supporting surface.

A further object is to provide an arrangement of rotatable and sliding dome assemblies each having a dome member and in which with the dome member of the rotatable dome assembly extending below the load supporting surface, the sliding dome assembly may be positioned thereover.

A further object is to provide an arrangement as last noted in which the sliding dome assembly may be retained in its position over the inverted rotatable dome assembly.

The above and other objects and advantages of the invention will appear from the following detailed description of certain embodiments of the invention.

Now in order to acquaint those skilled in the art with the manner of constructing and utilizing apparatus according to the present invention, there is described in connection with the accompanying drawings certain preferred embodiments of the invention.

In the drawings:

FIGURE 1 is a side elevational view of a transfer truck incorporating apparatus according to the invention and a freight container supported thereby, with the freight container being broken away to show the dome members of the sliding and rotating dome assemblies extending into certain recesses in the bottom wall of the freight container;

FIGURE 2 is a plan view of the apparatus of the invention shown in FIGURE 1 but with the sliding bolster assembly of the apparatus removed;

FIGURE 14 is an enlarged plan view of latch mechanism arranged at the forward end of the apparatus of FIGURE 2 for retaining the end of a freight container against vertical movement;

FIGURE 15 is an end view of the latch mechanism of FIGURE 14 taken substantially along the line 15—15 and looking in the direction indicated by the arrows;

FIGURE 16 is an enlarged plan view of latch mechanism mounted intermediate the ends of the semi-trailer chassis of FIGURE 5 for preventing vertical movement of the inner ends of the container supported on the chassis;

FIGURE 17 is an end view of the latch mechanism of FIGURE 16 taken substantially along the line 17—17 of FIGURE 16 and looking in the direction indicated by the arrows;

FIGURE 18 is a perspective view of the bottom of a freight container with which the apparatus of the invention may be employed.

Figure 3:
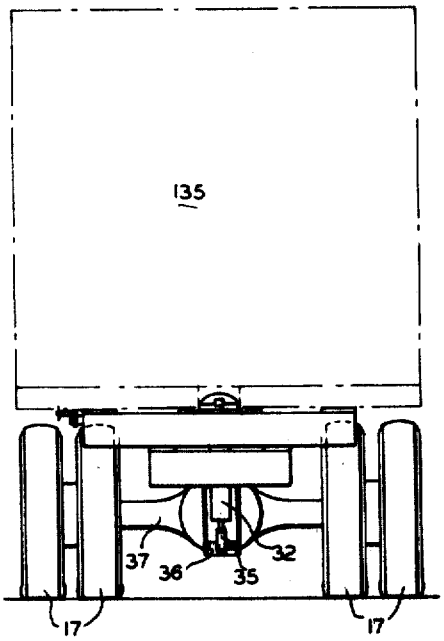
FIGURE 3 is a rear elevational view of the transfer truck of FIGURE 1 with a freight container being shown in broken lines.

Referring now to FIGURES 1 through 3 the present invention is shown incorporated with a truck 14 of the type commonly used for local or short haul delivery purposes. The truck of the type noted is referred to in the art as a transfer truck and comprises a conventional chassis 15 mounted on forward and rearward road engaging wheels 16 and 17, respectively, a cab 18 for a driver, and the usual engine and control means (not shown) arranged in any well known manner for driving and steering the truck. The embodiment of apparatus of the present invention incorporated with the truck 14 comprises a load supporting structure or frame indicated at 22 defined by a pair of spaced apart longitudinally extending parallel frame members 23—23 which are braced by a plurality of transversely extending frame members 24. A sliding dome assembly 25 is mounted for sliding movement on and longitudinally relative to the supporting structure or frame 22 between the forward and rearward ends of the latter. A rotatable dome assembly 26 is mounted for rotation on an axis extending transversely of and at the rearward end of the supporting structure or frame 22. The load supporting structure or frame 22 is pivotally mounted at its forward end at the forward end of the truck chassis 15 on an axis extending transversely of the latter by means of pivot shafts 28—28 carried by the frame members 23 rotatably mounted in bearings 29—29 carried by the truck chassis. A hydraulic piston and cylinder assembly 30 is arranged between the truck 14 and the load supporting structure 22 inwardly of the rear ends thereof and comprises a cylinder 32 pivotally mounted at one end as at 33 in framing 34 extending transversely of the supporting structure 22 and a piston rod 35 which at its outer end has pivotal connection with suitable frame and bracket means 36 at the rear axle assembly 37 of the truck chassis. The piston and cylinder assembly 30 may be energized by hydraulic fluid under pressure to effect upward movement of the cylinder 32 so as to pivot the load supporting structure 22 about the axis defined by the shafts 28 to thereby raise and lower the rearward end of the load supporting structure 22, for a purpose to be described.

Figure 7:
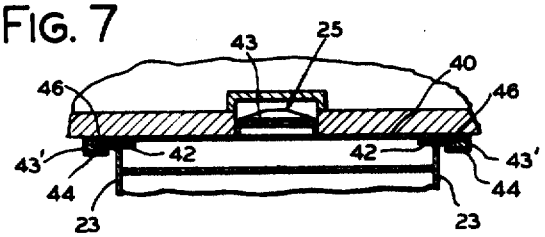
FIGURE 7 is a detail vertical sectional view of a sliding dome assembly of the invention with the view being taken substantially along the line 7—7 of FIGURE 1 looking in the direction indicated by the arrows.

On reference now to FIGURE 7, it will be seen that the sliding dome assembly 25 comprises a plate member 40 extending transversely of and across the upper flanges 42 of the frame members 23. A dome member 43 is secured to the upper container supporting surface of plate member 40 centrally between the ends thereof for extending into a recess or aperture in the bottom wall of a freight carrier as will be described. The plate member 40 at its opposite ends is provided with spacer blocks 43' and bottom plate members 44 arranged to form channels for sliding engagement with the laterally outwardly projecting flanges 46 of the frame members 23 to thus provide a guide for the sliding dome assembly for movement fore and aft on the load supporting structure 22.

Figure 8:
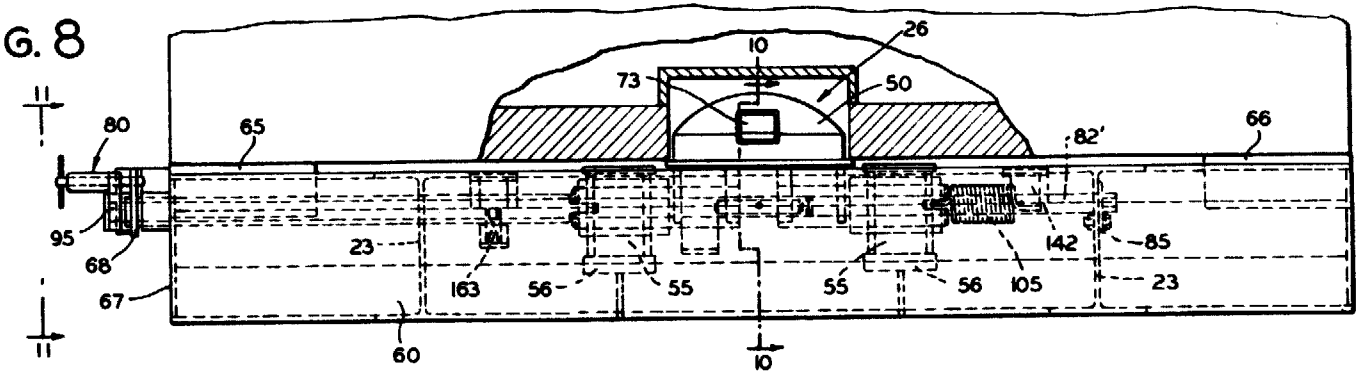
FIGURE 8 is an end elevational view of a rotatable dome assembly of the invention with the view being taken substantially along the line 8—8 of FIGURE 1 and looking in the direction indicated by the arrows.
Figure 9:
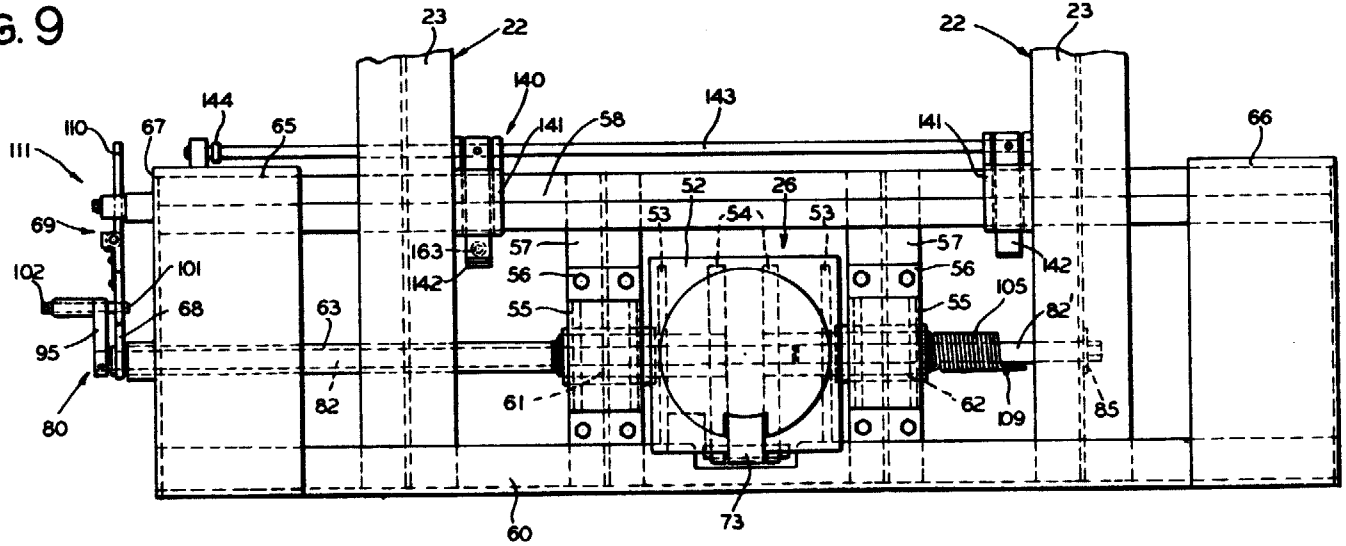
FIGURE 9 is a plan view of the rotatable dome assembly shown in FIGURE 8.

Referring now to FIGURES 8 through 13, it will be seen that the rotatable dome assembly 26 comprises a hollow dome member 50 of like size and shape as the dome member 43 of the sliding dome assembly 25. The dome member 50 is secured as by welding to a plate member 52 which at its side edges has spaced apart lengthwise extending outer and inner flanges 53 and 54, respectively, secured thereto as by welding at the bottom surface of the plate member 52. A pair of bearing assemblies 55 are suitably mounted adjacent the outer sides of flanges 53 by means of mounting plates 56 rigidly mounted on longitudinally extending passed apart frame members 57 at either side of the rotatable dome assembly 26 and which frame members 57 are secured at their forward ends to a transversely extending frame or bracing member 58 lying below the upper surfaces of and extending laterally outwardly beyond the frame members 23 of the load supporting structure 22. The rearward ends of the frame members 57 are secured to a reinforcing channel frame member 60 extending transversely of and at the outer or rearward end of the load supporting frame 22. A pair of journals 61 and 62 extend laterally outwardly from the inner flanges 54 and through the bearing assemblies 55 with the journals 61 and 62 and the bearings 55 thus providing an axis of rotation for the rotatable dome assembly 26 extending transversely of and at the rear end of frame 22. A tubular shaft 63 has connection at one end with journal 61 and which as best seen in FIGURE 9 extends laterally outwardly to the left hand side of the truck. The transverse frame members 58 and 60 at their outer ends support plate members 65 and 66, the upper surfaces of which, as will appear, define a load supporting surface means to provide for supporting the bottom wall of one end of a freight container, as will be described. Preferably, the upper surfaces of the load supporting plates 65 and 66 lie in a plane slightly below the plane of the upper surface of plate member 40 of the sliding dome assembly 25, so as to provide clearance for the bottom of the container. The aforementioned tubular shaft 63 extends through a downwardly extending side flange 67 of the load supporting plate 65. A crank arm 68 is rigidly secured to the outer end of the tubular shaft 63 with the crank arm 68 forming part of a dome rotating assembly 69 to be later described for effecting rotation of the dome assembly 26 about the axis defined by the journals 61 and 62.

Figure 13:
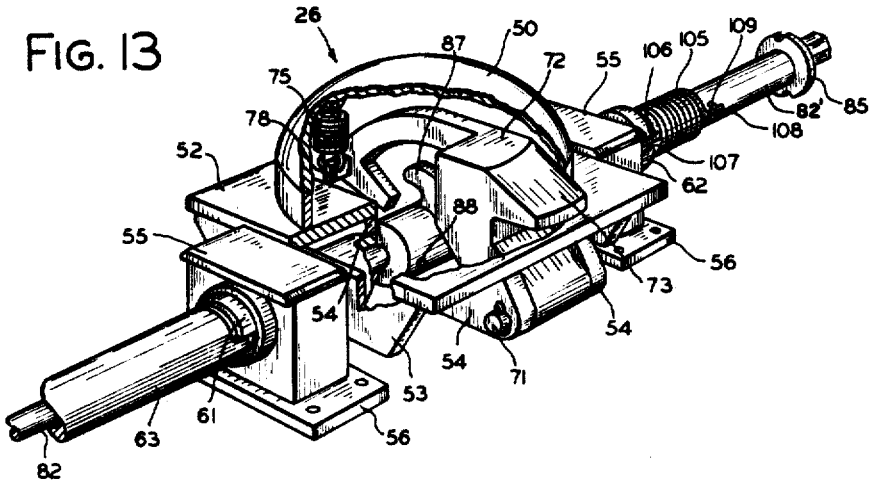
FIGURE 13 is a perspective view of a rotatable dome assembly of the invention with parts being broken away to show certain components of the assembly.
Figure 10:
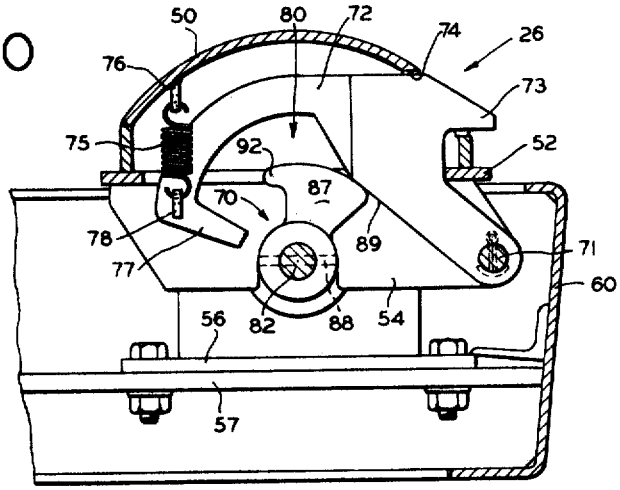
FIGURE 10 is a vertical sectional view taken substantially centrally of the rotatable dome assembly with the view being taken substantially along the line 10—10 of FIGURE 8 and looking in the direction indicated by the arrows.

As best seen in FIGURES 10 and 13, latch means 70 comprises a latch 72 pivotally connected as at 71 to the rearwardly extending lower ends of the flanges 54. The latch 72 is formed with a latch nose 73 which is adapted to be disposed inwardly and outwardly of a latch nose opening 74 opening rearwardly and outwardly of dome member 50. A coil spring 75 is connected at one end to upper forward end of the inner wall of the dome member 50 as at 76 and at its other end a lug at the elbow of an arm 77 of the latch as at 78. As viewed in FIGURE 10, the spring 75 normally biases the latch 72 in a clockwise direction about its pivot axis 71 to dispose the latch nose 73 to a latching position projecting outwardly of the latch nose opening 74.

Figure 11:
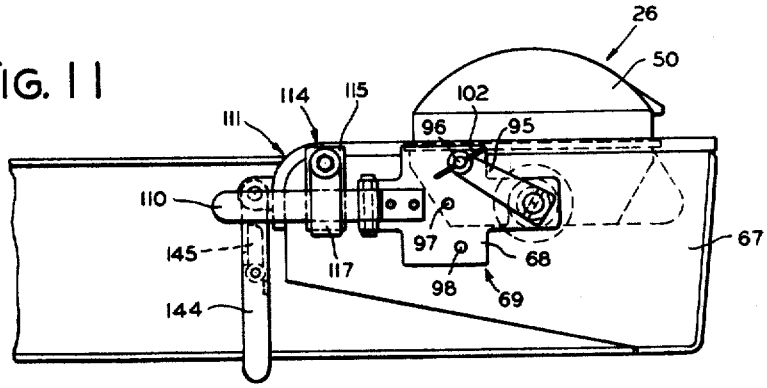
FIGURE 11 is a side elevational view of the rotatable dome assembly as viewed along line 11—11 of FIGURE 8, looking in the direction indicated by the arrows and in which the dome member of the dome assembly is in its upright position.

Lock means indicated generally at 80 is associated with the latch 72 and, as shown, comprises a rod 82 extending coaxially of and through the tubular rod 63, the journal 61 and with its inner end supported in journal 62. The rod 82 has a cam member 87 fixed thereto as by a pin 88 to the portion thereof extending between the pair of flanges 54 of the plate member and in alignment with latch 72 so that upon rotary movement of the rod 82, the cam member 87 may be disposed in end and intermediate rotative positions with respect to the latch 72. In the one end position of the cam member 87 as shown in FIGURE 10, the cam is in abutting engagement with an under surface 89 of the latch to retain the latch nose 73 in non-yielding latching position projecting outwardly of the latch nose opening 74. Upon movement of the cam 87 as by turning of the rod 82 in a counterclockwise direction as viewed in FIGURE 10, the cam may be disposed in an intermediate position between its end positions at which it is disengaged from the cam surface 89 and in this position of the cam, the latch nose 73 will be yieldingly retained in its latching position to project outwardly of the latch nose opening 74 by the coil spring 75. Upon further turning movement of the cam 87 in a counter clockwise direction to its other end position, the projecting nose end 92 thereof engages the arm 77 of the latch 72 to bias the latter against the force of spring 75 to dispose the latch nose 73 in latch disengaging position within the dome member 50. The rod 82 as best seen in FIGURE 9 projects laterally outwardly of tubular rod 63 and crank arm 68 and at its outer end carries a crank arm 95 for rotating the same. In FIGURE 11, it will be seen that the crank arm or plate 68 of the dome rotating handle assembly 69 is provided with a series of three holes or openings 96, 97 and 98 which are adapted to be selectively engaged by a spring loaded pin 101 mounted at the outer end of crank arm 95 by manipulation of the handle 102. Upon withdrawing the spring loaded pin 101 from the holes in plate 68 the crank arm 95 may be positioned selectively to effect disposal of the aforementioned cam 87 in its above discussed end positions for locking the latch member 72 with its latch nose 73 disposed inwardly or outwardly of the latch nose opening or in an intermediate position in which the latch nose 73 is yieldingly biased by the spring 75 to a position extending outwardly of the latch nose opening 74.

Figure 12:
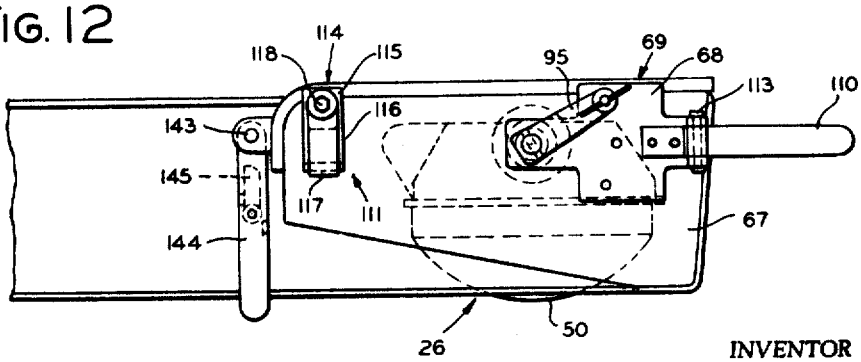
FIGURE 12 is a side elevational view like that of FIGURE 11 but in which the rotatable dome assembly has been rotated so that its dome member is in an inverted position.

Upon reference now to FIGURES 8, 9 and 13, it will be seen that a torsion coil spring 105 is disposed around a rod 82' which is in end to end axial alignment with rod 82. The inner end of rod 82' is supported in the journal 62 and its outer end projects through the web of frame member 23 at the side of the load supporting structure 22 opposite the dome rotating assembly 69 and at which retaining means 85 is provided. One end of the spring as at 106 fits into a slot 107 formed in journal 62 and the other end 108 of the spring bears against a pin 109 mounted in the rod 82'. The rod 82' provides rotational or torsional adjustment of coil spring 105 and when such adjustment is made the rod 82' is held from rotation and axial movement by the retaining means 85. It will also be noted and as will be described in greater detail hereinafter, that the torsion spring 105 normally tends to rotate the rotatable dome assembly 26 in a counterclockwise direction as viewed in FIGURES 10 through 13 to dispose the dome member 50 to its inverted position as shown in FIGURE 12 and at which it lies below the upper load supporting surfaces of plates 65 and 66.

The dome rotating means 69 as before mentioned includes a crank arm plate 68 to which a latch handle 110 of latch means 111 is pivotally secured as at 113 providing for movement of the latch handle 110 into and out of engagement with a handle retaining assembly 114. The assembly 114 comprises a plate member 115 secured laterally outwardly of and at the side 67 of the plate member 65. The plate member 115 is formed with a horizontally extending groove 116 into which the latch handle 110 may be positioned by pivotal movement of a retaining member 117 pivoted as at 118 to the upper end of member 115 for normally closing the groove 116. The retaining member 117 is disposed in the position shown in FIGURES 11 and 12 of the drawings by gravity but may be manually pivoted in either direction to expose the groove 116. Upon rotating the dome assembly 26 by turning latch handle 110 and crank arm plate 68 in a clockwise direction as viewed in FIGURE 12 to the position shown in FIGURE 11, the latch handle 110 may be positioned in the groove 116, and the member 117 then released so as to prevent the lateral outward movement of the handle 110 from the groove 116. In the position of the parts shown in FIGURE 11 of the drawings, the handle 110 is in its locked position with respect of the retaining assembly 114 and in which position the dome member 50 of the rotatable dome assembly is disposed in a position at which it projects above the load supporting surfaces of the plate members 65 and 66. In this position of the parts, the afore referred to torsion spring 105 is caused to be loaded and tends to bias the rotatable dome assembly 26 for rotation in a counter clockwise direction toward its inverted position of FIGURE 12. Upon suitable pivotal movement of the retaining member 117 the handle 110 may be pivoted around its pivot 113 to withdraw it from the groove 116. In this position of the parts and as will be described, the loaded torsion spring 105 upon release of the dome member 50 from a recess of the container effects the rotation of the rotatable dome assembly 26 in a counter clockwise direction to the position shown in FIGURE 12 of the drawings. It will be observed by reason of the foregoing arrangement that the lock means 80 for latch 72 may be actuated in either of the positions of the rotatable dome assembly as shown in FIGURES 11 and 12.

The apparatus of the invention further comprehends, as shown in FIGURE 2 the provision of latch means 120 at the forward end of the load supporting structure 22. The latch means 120 is shown in greater detail in FIGURES 14 and 15 to which reference may now be had. As shown in FIGURES 14 and 15, a pair of frame plates 122 and 123 are secured to and extend laterally outwardly away from the longitudinally extending frame members 23 of the supporting structure 22. A manually actuatable handle 124 has spring loaded pivotal connection as at 125 to the outer end of the plate member 122 and a link 126 extends from the handle to a crank arm 127 secured to a shaft 128 which carries a latching lug 129 of a lug assembly 130. The lug 129 is fixed to the shaft 128 and is rotatable therewith so as to be disposed in either the full or dotted line positions of FIGURE 14. A link 132 extends from crank arm 127 transversely across the forward end of the frame 22 for connection with a crank arm 133 disposed laterally outwardly of the adjacent longitudinally extending frame member 23. A shaft 134 has connection with the crank arm 133, and it carries for rotation therewith a latching lug 131 which is adapted to be disposed in either the full or dotted line positions shown in FIGURE 14. It will be seen upon movement of the actuating handle 124 from its full line position as shown in FIGURE 14 to its broken line position that movement of the rods 126 and 132 is effected for moving the latch lugs 129 and 131 from their full line latched positions to their broken line unlatched positions. As will be described hereinafter, the aforementioned latching lugs 129 and 131 are effective in their latched position for preventing relative vertical movement of one end of a freight container when mounted on the supporting structure 22.

Referring now to FIGURE 18, it will be observed that the bottom wall of a freight container 135 is provided with a pair of dome receiving recesses 136 and 137 inwardly of each of the opposite ends thereof. The containers are also provided with a pair of pockets 138 in their end walls for receiving the latch lugs 129 and 131.

In the position of the container 135 as shown in FIGURE 1, it will be observed that dome member 43 of the sliding dome assembly 25 is disposed in outer dome recess 136 at the forward end of the container 135 and the dome member 50 of the rotatable dome assembly is disposed in the inner dome recess 137 at the rearward end of the container. In this position of the domes in the dome recesses of the container, the latch assembly 120 may be actuated to dispose the lugs 129 and 131 into the pockets 138 in the forward end wall of the container. Thus with the container 135 mounted on the load supporting structure 22 as above described, the domes 43 and 50 of the sliding and rotatable dome assemblies are effective to prevent fore and aft and transverse movements of the container relative to the supporting structure 22 and the lugs 129 and 131 are effective to prevent vertical movement of the forward end of the container with respect to the frame 22. In this position of the parts, the latch nose 73 of the rotatable dome assembly 26 projecting through the latch nose opening 74 engages a portion of the periphery of the bottom wall of the container at dome opening 137 so as to prevent vertical movement of the rearward end of container relative to the supporting structure 22. In the position of the parts as shown in FIGURE 10 of the rotatable dome assembly 26, the latch 72 is locked in its latching position and the rotatable dome assembly 26 is retained in its upright position as shown in FIGURES 10 and 11 by the latch means 111. The container 135 is thus securely mounted to the supporting structure 22 and the container 135 may be transported by the vehicle as desired. If desired, lock means 80 may be actuated to dispose cam 87 in its intermediate position at which the latch 72 is yieldingly biased to its latched position.

The present invention further comprehends the provision of latch means 140 inwardly of the rotatable dome assembly 26 as best seen in FIGURES 2, 8, 9, 11 and 12. The latch means 140 provides for retaining the sliding dome assembly 25 in position over the rotatable dome assembly 26 in the inverted portion of the latter as shown in FIGURE 12. The latch means 140 comprises latch dog supporting members 141 mounted on the upper surface of the transverse frame member 58 inwardly of each of the frame members 23. A latch dog 142 extends through each of the members 140 and are normally spring biased as at 163 so that the rearward ends thereof lie in position to engage the forward edge of the plate 40 of the sliding dome assembly when the latter is positioned over the rotatable dome assembly 26 to prevent movement of the sliding bolster assembly forwardly of frame 22. The opposite ends of the latch dogs 40 are connected to a shaft 143 extending transversely of the frame 22. A handle 144 is connected to one end of shaft 143 and manipulation of the handle in a clockwise direction as viewed in FIGURES 11 and 12 effects rotation of the latching dogs 142 to dispose the rearward ends thereof into positions lying below the plate 40 of the sliding dome assembly 25. A retaining lug as shown at 145 is pivotally mounted on the handle 144 and may be rotated in a clockwise direction as viewed in FIGURE 12 to engage the inner end of plate member 65 to hold the handle 144 in a position to maintain the rearward ends of latching lugs 142 in their downward or in non-engaging position with respect to the sliding bolster assembly 25. With the handle 144 in its released position, the sliding dome assembly 25 may be advanced rearwardly along the frame members 23 and upon engaging the rearwardly extending ends of the dogs 142 bias them downwardly permitting the sliding dome member to be disposed over the inverted rotatable dome assembly 26. With the sliding dome assembly in the position noted, the rearward ends of the dogs 142 engage the forward edge of the plate 40 of the sliding dome assembly so as to retain it in its aforedescribed position. When it is desired to effect movement of the sliding dome assembly from its position last noted, the handle 144 is turned in a clockwise direction and the retaining lug 145 disposed in a position to retain the handle 144 in a position at which the rearward ends of the latching dogs 142 lie below the plate 40 of the sliding dome assembly 25.

Figure 6:
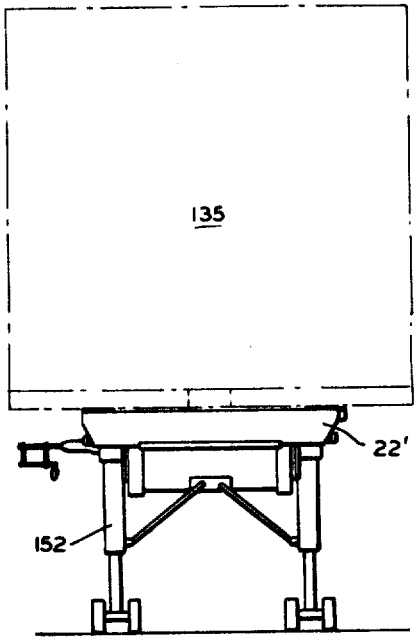
FIGURE 6 is a front elevational view of the semi-trailer chassis and apparatus shown in FIGURES 4 and 5 with one end of a freight container shown in broken lines.
Figure 5:
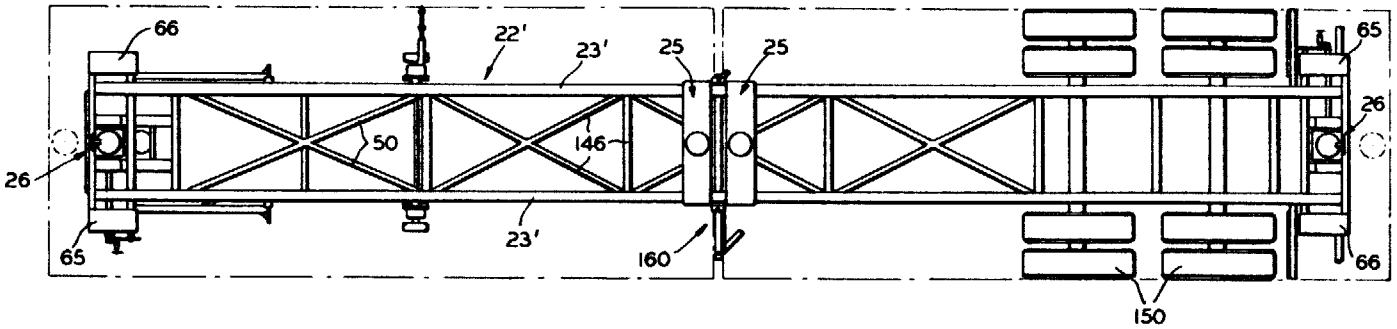
FIGURE 5 is a plan view of the chassis and apparatus shown in FIGURE 4.
Figure 4:
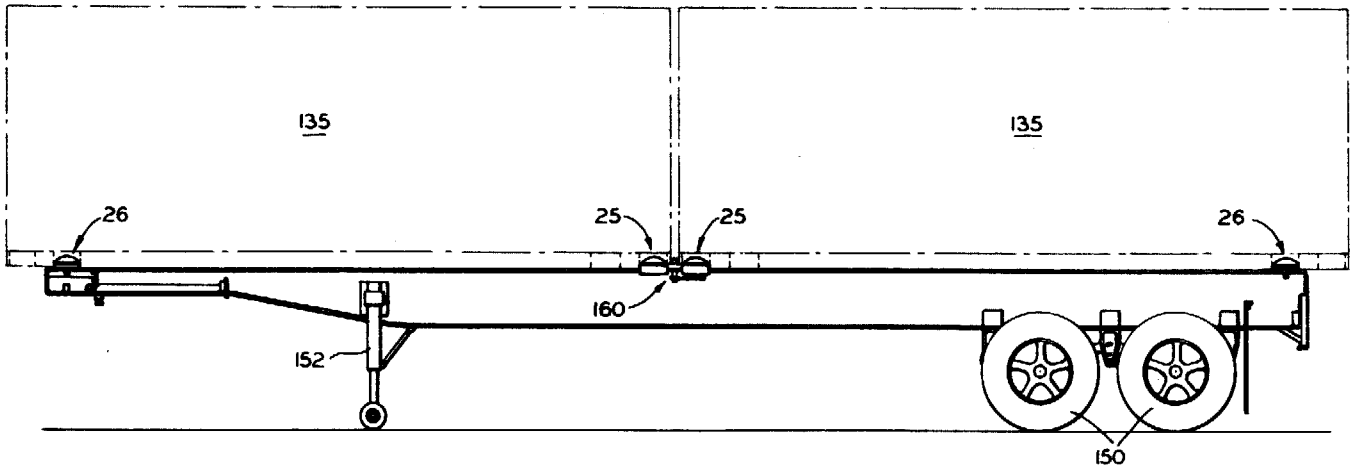
FIGURE 4 is a side elevational view of a semi-trailer highway chassis embodying apparatus of the invention for the over the road transporting of a pair of freight containers, the latter being shown in broken lines.

Referring now to FIGURES 4, 5 and 6, we have shown the apparatus of the invention incorporated in a semi-trailer highway chassis of a construction for the transporting over the road of a pair of freight containers such as that shown at 135. The chassis of the semi-trailer of FIGURES 4 and 5 includes a load supporting frame structure 22' comprising longitudinally extending frame members 23'. The members 23' are in all significant structural respects like the frame members 23 described in connection with FIGURES 1 and 2, but are of greater length so as to provide for the support of a pair of freight containers. Again, appropriate bracing as shown at 146 is provided between the frame members 23' to adequately reinforce the structure. The load supporting structure 22' also includes suitable road engaging wheels 150 and a retractable supporting ground engaging assembly 152 of known construction for supporting the chassis when detached from its hauling tractor.

The apparatus of FIGURES 4 and 5 includes a pair of sliding dome assemblies 25 as previously described mounted for sliding movement from positions centrally of or intermediate the ends of the frame 22′ to positions one each at the outer ends of the frame to overlie the rotatable dome assemblies 26 in the inverted positions of the latter as above described. In the apparatus of FIGURES 5 and 6, latch means 160 is arranged centrally of the frame to extend transversely thereof and is adapted to be actuated for retaining the adjacent inner ends of the containers against vertical movement relative to the chassis 22′. The latch mechanisms 160 is similar in most respects to the latch mechanism 120 above described in connection with FIGURES 14 and 15 and is shown in detail in FIGURES 16 and 17 to which reference may now be had. As shown in these figures, a pair of plate or frame members 122′ and 123′ extend laterally outwardly of the frame members 23′. An operating handle 124′ has pivotal connection as at 125′ to the outer end of frame member 122′. A link 126′ extends from the handle 124′ to the crank arm 127′ connected to a shaft 128′ which carries a latching lug 129′, of a lug assembly 130′. A second link 132′ extends from the crank arm 127′ to a crank arm 133′ which is fixed to a shaft 134′ having a latch lug 131′ connected thereto. The lugs 129′ and 131′ are adapted to be positioned in their full and dotted line positions as shown in FIGURE 16 by manipulation of handle 124′. In the full line positions of the lugs 129′ and 131′ the opposite ends thereof are adapted to enter into and engage in pockets, such as shown at 138 in FIGURE 18, in the adjacent inner end walls of the pair of containers 135 to restrain the inner ends of the containers against vertical movement relative to the chassis of the semi-trailer.

In the aforedescribed arrangement of sliding dome assemblies and rotatable dome assemblies, it will be observed that upon rotation of the rotatable dome assemblies 26 to their inverted positions, that the dome members 50 thereof lie below the plane of the load supporting surface means defined by load supporting plate members 65 and 66, and in the inverted positions of the rotatable dome assemblies 26 the sliding dome assemblies 25 may be moved along the frame structures 22 and 22′ to overlie the rotatable dome assemblies. As before described, the sliding dome assemblies 25 may be retained in position over the rotatable dome assemblies 26 or released for movement along the frames 22 or 22′ by appropriate manipulation of latch means 140.

Figure 19:
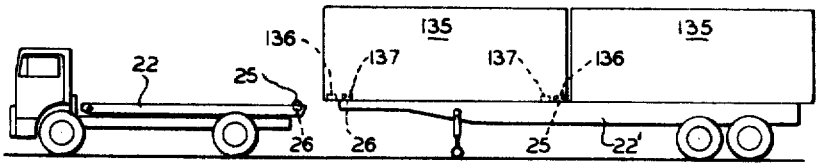
FIGURES 19 through 26 diagrammatically illustrate the transfer of a freight container from the semi-trailer chassis of FIGURE 4 to a transfer truck as shown in FIGURE 1.
Figure 20:
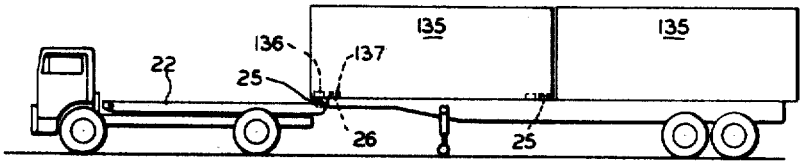
Figure 21:
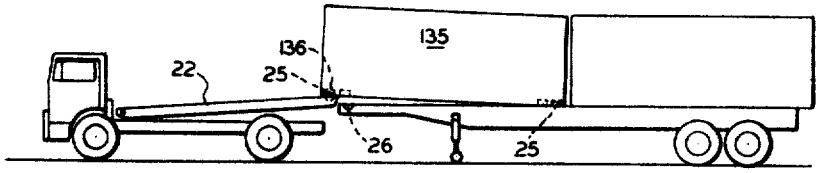
Figure 22:
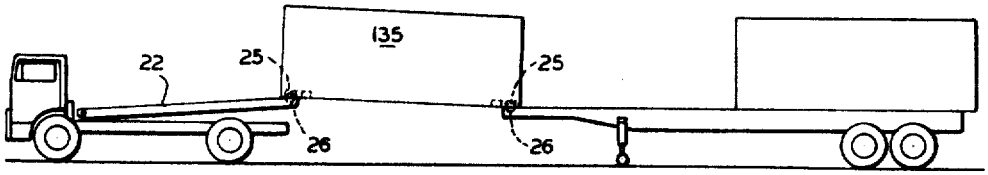
Figure 23:
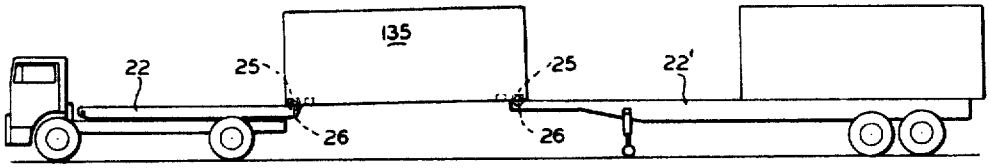
Figure 24:
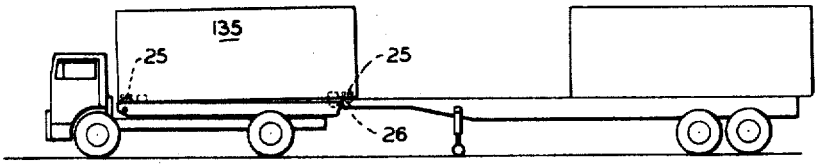
Figure 25:
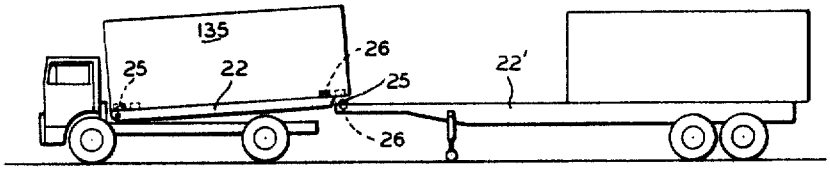
Figure 26:
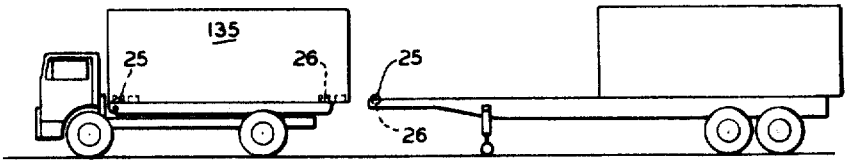

There shall now be described one utilization of the apparatus of the invention in connection with the transfer truck of FIGURES 1 and 2 and a semi-trailer chassis of FIGURES 4 and 5. In FIGURES 19 through 26, the transfer truck of FIGURE 1 and the semi-trailer chassis of FIGURE 4 are shown diagrammatically in side elevation. In FIGURE 19, it will be observed that a pair of freight containers 135 are supported in end to end relation on the semi-trailer structure 22′. In effecting the transfer of one container 135 from a semi-trailer supporting structure 22′ to the supporting structure 22 of the transfer truck, the transfer truck is first backed from the position shown in FIGURE 19 to the position shown in FIGURE 20. Prior to movement of the transfer truck to its position of FIGURE 20 the rotatable dome assembly 26 on frame 22 is disposed in its inverted position and the sliding dome assembly 25 disposed thereover. With the sliding dome bolster 25 in the position noted, the hydraulic piston and cylinder assembly 30 is caused to be energized to raise the frame structure 22 to engage the dome member of the sliding dome assembly with the end dome recess 136 of the freight container 135. Prior to the raising of the rear end of frame 22 of the transfer truck, the rotatable dome 26 at the outer adjacent end of the semi-trailer chassis 22′ is disposed to its unlatched position and upon raising of the end of the freight container, the loaded torsion spring 105 effects the rotation of the rotatable dome to the inverted position. The inner end of the freight container 135 as shown in FIGURE 1 has its outer dome recess 136 in engaging relation with the dome member of sliding bolster 25 centrally of the semi-trailer chassis 22′. The transfer truck is then driven forwardly as shown in FIGURE 21 causing the container 135 to be carried on the sliding bolster assembly 25 of the semi-trailer chassis 22′ to the position shown in FIGURE 22 at which the container 135 is now supported at its forward end by the sliding dome assembly 25 of the frame 22 on the transfer truck and the sliding dome assembly of the semi-trailer chassis 22′. With the container 135 disposed in this position, the hydraulic piston assembly 30 of the transfer truck is actuated to lower the rearward end of the frame 22 to the position shown in FIGURE 23 of the drawings. At this point the sliding bolster assembly 25 on chassis 22′ is retained in its position over the rotatable bolster assembly by actuation of latch means 140 as described in connection with FIGURE 9. With the components in the position noted, the transfer truck is then backed up toward the semi-trailer chassis 22′ causing the sliding dome assembly 25 to move forwardly on frame 22 dispesing the freight container 135 to the position shown in FIGURE 24. With the container 135 in this position, the hydraulic piston and cylinder assembly 30 is then again actuated to raise the rear end of frame 22 of the transfer truck to first engage the dome member of the rotatable dome assembly 26 of frame 22 with dome recess 137 of the container and upon continued upward movement, as shown in FIGURE 25, to release the end recess 136 of the container 135 from the sliding dome assembly 25 of the semi-trailer chassis 22′ which is disposed in a position overlying the rotatable dome assembly 26 at the outer end of the semi-trailer chassis 22′. The truck is then driven forwardly to the position of FIGURE 26 and the hydraulic piston and cylinder assembly 30 thereafter actuated to lower the frame 22 and in which position the transfer truck may now be driven off to deliver or store the container as desired. With the container positioned on the truck as shown in FIGURE 26, the aforementioned latch assembly 124 as described in connection with FIGURES 14 and 15 may be actuated to disposed the locking lugs 129 and 135 into the end pockets 138 of the container, and the rotatable dome latch mechanism may be actuated to lock the latch 72 in its position in engagement with the periphery of the bottom wall of the container at a dome recess 137 so that the container is rigidly and firmly held on the transfer truck.

The aforedescribed utilization of the apparatus for transferring a freight container from a semi-trailer to a transfer truck is exemplary of the utility of the apparatus of the invention. However, it will be understood that the aforedescribed sliding and rotatable dome assemblies may be incorporated with other suitable load supporting structures for use at loading docks or storage facilities and in view of which the apparatus of the invention is not necessarily limited for incorporation with frame structures of transfer trucks or semi-trailers.

While there has been shown and described certain preferred embodiments of the invention, it will be understood that various modifications and rearrangements may be made therein without departing from the spirit and scope of the invention.

The invention claimed is:

1. In an apparatus of the class described the combination of a structure having load supporting surface means, a dome assembly rotatably mounted on said structure comprising a dome member extending above and below said supporting surface means in different rotative positions of said dome assembly, an opening in said dome member, and a latch pivotally mounted on said dome assembly for movement of a portion thereof inwardly and outwardly of said opening.

2. In an apparatus of the class described the combination of a structure having load supporting surface means, a dome assembly rotatably mounted on said supporting structure comprising a dome member extending above and below said supporting surface means in different rotative positions of said dome assembly, an opening in said dome member, a latch pivotally mounted on said dome assembly for movement of a portion thereof inwardly and outwardly of said opening, and means for yieldingly biasing said latch with said portion thereof outwardly of said opening.

3. In an apparatus of the class described the combination of a structure having load supporting surface means, a dome assembly rotatably mounted on said supporting structure comprising a dome member extending above and below said supporting surface means in different rotative positions of said dome assembly, an opening in said dome member, a latch pivotally mounted on said dome assembly for movement of a portion thereof inwardly and outwardly of said opening, means for yieldingly biasing said latch with said portion thereof outwardly of said opening, and lock means selectively operable for locking said latch in position with said portion inwardly or outwardly of said opening.

4. In an apparatus of the class described the combination of a structure having load supporting surface means, a dome assembly rotatably mounted on said structure comprising a dome member extending above and below said supporting surface means in different rotative positions of said dome assembly, first spring means normally biasing said dome assembly to a position at which said dome member is disposed below said supporting surface means, first latch means for restraining said dome assembly in position with said dome member extending above said supporting surface means against the force of said first spring means, a latch nose opening in said dome member, second latch means pivotally mounted on said dome assembly, said second latch means having a nose portion movable inwardly and outwardly of said nose opening upon pivotal movement of said second latch means, and second spring means for yieldingly biasing said second latch means with said nose portion thereof extending outwardly of said nose opening in said dome member.

5. In an apparatus of the class described the combination of a structure having load supporting surface means, a dome assembly rotatably mounted on said structure comprising a dome member extending above and below said supporting surface means in different rotative positions of said dome assembly, first spring means normally biasing said dome assembly to a position at which said dome member is disposed below said supporting surface means, first latch means for restraining said dome assembly in position with said dome member extending above said supporting surface means against the force of said first spring means, a latch nose opening in said dome member, second latch means pivotally mounted on said dome assembly, said second latch means having a nose portion movable inwardly and outwardly of said nose opening upon pivotal movement of said second latch means, second spring means for yieldingly biasing said second latch means with said nose portion thereof extending outwardly of said nose opening in said dome member, and lock means selectively operable for locking said second latch means in position with said nose portion inwardly or outwardly of said nose opening of said dome member.

6. In an apparatus of the class described the combination of a structure having load supporting surface means, a dome assembly rotatably mounted on said structure comprising a dome member extending above and below said supporting surface means in different rotative positions of said dome assembly, first spring means normally biasing said dome assembly to a position at which said dome member is disposed below said supporting surface means, first latch means for restraining said dome assembly in position with said dome member extending above said supporting surface means against the force of said first spring means, a latch nose opening in said dome member, second latch means pivotally mounted on said dome assembly, said second latch means having a nose portion movable inwardly and outwardly of said nose opening upon pivotal movement of said second latch means, second spring means between said dome member and said second latch means for yieldingly biasing said second latch means with said nose portion thereof extending outwardly of said nose opening in said dome member, and lock means having connection with said second latch means for selectively locking said second latch means in position with said nose portion inwardly or outwardly of said nose opening of said dome member.

7. In an apparatus of the class described the combination of a structure having load supporting surface means, a pair of bearings mounted in spaced apart relation on said structure, a dome assembly rotatably supported between said bearings by journals carried by said dome assembly rotatably mounted in said bearings, said dome assembly comprising a dome member extending above and below said supporting surface means in different rotative positions of said dome assembly, a latch nose opening in said dome member, a latch pivotally mounted inwardly of said dome assembly, said latch having a latch nose movable to positions inwardly and outwardly of said latch nose opening by pivotal movement of said latch, and spring means between said dome member and said latch for yieldingly biasing said latch to a position at which said latch nose projects outwardly of said latch nose opening.

8. In an apparatus of the class described the combination of a structure having load supporting surface means, a pair of bearings mounted in spaced apart relation on said structure, a dome assembly rotatably supported between said bearings by journals carried by said dome assembly rotatably mounted in said bearings, said dome assembly comprising a dome member extending above and below said supporting surface means in different rotative positions of said dome assembly, first spring means normally biasing said dome assembly to a position at which said dome member is disposed below said supporting surface means, first latch means for retaining said dome assembly in position with said dome member extending above said supporting surface means against said first spring means, a latch nose opening in said dome member, second latch means pivotally mounted inwardly of said dome assembly, said second latch means having a latch nose movable to positions inwardly and outwardly of said latch nose opening upon pivotal movement of said second latch means, spring means between said dome member and said second latch means for yieldingly biasing said second latch means to a position at which said latch nose projects outwardly of said latch nose opening, and lock means including a rod member extending co-axially of said journals and having connection with said second latch means for selectively locking said second latch means in position with said nose portion inwardly or outwardly of said nose opening of said dome member.

9. In an apparatus of the class described, the combination of a structure having load supporting surface means, a pair of bearings mounted in spaced apart relation on said structure, a dome assembly rotatably supported between said bearings by tubular journals carried by said dome assembly rotatably mounted in said bearings, said dome assembly comprising a dome member, a tubular shaft connected at one end with one of said journals, a rod extending coaxially of and through the other of said journals, first spring means between said other journal and said rod normally biasing said dome assembly to a position at which said dome member is disposed below said supporting surface means, a crank arm connected at the other end of said tubular shaft for rotating the same and said dome assembly against the force of said first spring means to dispose said dome member to a position extending above said supporting surface means, first latch means associated with said crank arm for engaging the latter to retain said dome assembly in position with said dome member extending above said supporting surface means against the force of said first spring means, a latch nose opening in said dome member, second latch means pivotally mounted inwardly of said dome assembly, said second latch means having a latch nose movable to positions inwardly and outwardly of said latch nose openings upon pivotal movement of said second latch means, second spring means between said dome member and said second latch means for yieldingly biasing said second latch means to a position at which said latch nose projects outwardly of said latch nose opening, a second rod extending through said tubular shaft, a lock member mounted on said second rod, and a second crank arm connected to said second rod for rotating the same for positioning said lock member with respect to said second latch means to retain said nose portion inwardly or outwardly of said nose opening of said dome member.

10. In an apparatus of the class described, the combination of a structure having load supporting surface means, a pair of bearings mounted in spaced apart relation on said structure, a dome assembly rotatably supported between said bearings by tubular journals carried by said dome assembly rotatably mounted in said bearings, said dome assembly comprising a dome member, a tubular shaft connected at one end with one of said journals, a rod extending coaxially of and through the other of said journals, first spring means between said other journal and said rod normally biasing said dome assembly to a position at which said dome member is disposed below said supporting surface means, a crank arm connected at the other end of said tubular shaft for rotating the same and said dome assembly against the force of said first spring means to dispose said dome member to a position extending above said supporting surface means, first latch means associated with said crank arm for engaging the latter to retain said dome assembly in position with said dome member extending above said supporting surface means against the force of said first spring means, a latch nose opening in said dome member, second latch means pivotally mounted inwardly of said dome assembly, said second latch means having a latch nose movable to positions inwardly and outwardly of said latch nose opening upon pivotal movement of said second latch means, second spring means between said dome member and said second latch means for yieldingly biasing said second latch means to a position at which said latch nose projects outwardly of said latch nose opening, a second rod extending through said tubular shaft, a lock member mounted on said second rod, a second crank arm connected to said second rod for rotating the same for positioning said lock member with respect to said second latch means to retain said nose portion inwardly or outwardly of said nose opening of said dome member, and means for releasably connecting said second crank arm to said first crank arm.

11. In an apparatus of the class described, the combination of a structure having load supporting surface means, a pair of bearings mounted in spaced apart relation on said structure, a dome assembly rotatably supported between said bearings by tubular journals carried by said dome assembly rotatably mounted in said bearings, said dome assembly comprising a dome member, a tubular shaft connected at one end with one of said journals, a rod extending coaxially of and through the other of said journals, coil spring means disposed around said rod and connected at one end to said other journal and at its other end to said rod normally biasing said dome assembly to a position at which said dome member is disposed below said supporting surface means, a crank arm connected at the other end of said tubular shaft for rotating the same and said dome assembly against the force of said coil spring means to dispose said dome member to a position extending above said supporting surface means, first latch means associated with said crank arm for engaging the latter to retain said dome assembly in position with said dome member extending above said supporting surface means against said coil spring means, a latch nose opening in said dome member, second latch means pivotally mounted inwardly of said dome assembly, said second latch means having a latch nose movable to positions inwardly and outwardly of said latch nose opening upon pivotal movement of said second latch means, second coil spring means connected at its opposite ends to said dome member and said second latch means for yieldingly biasing said second latch means to a position at which said latch nose projects outwardly of said latch nose opening, a second rod extending through said tubular shaft, a lock member mounted on said second rod, a second crank arm connected to said second rod for rotating the same for positioning said lock member with respect to said second latch means to retain said nose portion inwardly or outwardly of said nose opening of said dome member.

12. In an apparatus of the class described the combination of a structure comprising load supporting surface means, and a pair of elonagted parallel spaced apart frame members, a rotatable dome assembly mounted on said structure on an axis extending transversely of said frame members, said rotatable dome assembly having a first dome member extending above and below said supporting surface in different rotative positions of said dome assembly, a sliding dome assembly extending transversely of said frame members, said sliding dome assembly having a second dome member extending above said frame members, means for mounting said sliding dome assembly for sliding movement relative to said frame members, and said sliding dome assembly being adapted to be positioned on said frame members to overlie said rotatable dome assembly in the rotative position of the latter at which said first dome member extends below said supporting surface means.

13. In an apparatus of the class described the combination of a structure comprising load supporting surface means, and a pair of elongated parallel spaced apart frame members the upper surfaces of which lie below said load supporting surface means, a rotatable dome assembly mounted on said structure on an axis extending transversely of said frame members at said supporting surface means, said rotatable dome assembly having a first dome member extending above and below said upper surfaces of said frame member in different rotative positions of said rotatable dome assembly, a sliding dome assembly comprising a plate member extending transversely of said frame members and having its upper surface lying in the plane of said supporting surface means, said sliding dome assembly having a second dome member extending above said frame members, means for mounting said sliding dome assembly for sliding movement relative to said frame members, and said sliding dome assembly being adapted to be positioned to overlie said rotatable dome assembly in the rotative position of the latter at which said first dome member extends below said upper surfaces of said frame members.

14. In an apparatus of the class described the combination of a structure comprising a load supporting means comprising a pair of laterally spaced apart load supporting surfaces lying in a common plane and a pair of elongated parallel spaced apart frame members disposed between said load supporting surfaces and having their upper surfaces lying below said load supporting surfaces, a dome rotatable assembly mounted on said structure on an axis extending transversely of said frame members, said rotatable dome assembly having a first dome member extending above and below said upper surfaces of said frame member in different rotative positions of said rotatable dome assembly, a sliding dome assembly comprising a plate member extending transversely of said frame members and having its upper surfaces lying in the plane of said load supporting surfaces, said sliding dome assembly having a second dome member extending above said frame members, means for mounting said sliding bolster assembly for sliding movement lengthwise of said frame members, said sliding bolster assembly being adapted to be positioned to overlie said rotatable dome assembly in the rotative position of the latter at which said first dome member extends below said supporting surface, and with said plate member lying between said spaced apart load supporting surfaces.

15. In an apparatus for supporting a freight container having a bottom wall formed with dome recess means at opposite ends thereof and pocket means in an end wall thereof, the combination of a structure comprising load supporting surface means, a rotatable dome assembly having a first dome member extending above said supporting surface means at one end of said structure, a sliding dome assembly having a second dome member extending above said supporting surface means at the other end of said structure, said first dome member and said second dome member being adapted to extend into dome recesses at opposite ends of the bottom wall of said freight container to prevent movement of said container fore and aft and sidewise of said load supporting surface means, and latch means mounted on said structure for entering said pocket means of said container to restrain the latter against vertical movement relative to said load supporting surface means.

16. In an apparatus for supporting a freight container having a bottom wall formed with dome recess means at opposite ends thereof and pocket means in an end wall thereof, the combination of a structure comprising load supporting surface means, a rotatable dome assembly having a first dome member extending above said supporting surface means at one end of said structure, a latch mounted on said rotatable dome assembly, a sliding dome assembly having a second dome member extending above said supporting surface means at the other end of said structure, said first dome member and said second dome member being adapted to extend into dome recesses at opposite ends of the bottom wall of said freight container to prevent movement of said container fore and aft and sidewise of said load supporting surface means, said latch of said first dome member being adapted to engage the edge of the bottom wall of said container at said one end of said structure, and a second latch mounted on said structure for entering said pocket means of said container, said second latch being adapted to restrain said freight container against vertical movement relative to said load supporting surface means.

17. In an apparatus for supporting a freight container having a bottom wall formed with dome recess means at opposite ends thereof and pocket means in an end wall thereof, the combination of a structure comprising load supporting surface means, and a pair of elongated parallel spaced apart frame members, a rotatable dome assembly mounted on said structure on an axis extending transversely of said frame members, said rotatable dome assembly having a first dome member extending above and below said supporting surface means in different rotative positions of said rotatable dome assembly, a sliding dome assembly extending transversely of said frame members, said sliding dome assembly having a second dome member extending above said frame members, means for mounting said sliding dome assembly for sliding movement relative to and between opposite ends of said frame members, said sliding dome assembly being adapted to be positioned on said frame members at one end thereof to overlie said rotatable dome assembly in the rotative position of the latter at which said first dome member extends below said supporting surface means, said first dome member in its position extending above said supporting surface means and said second dome member of said sliding dome assembly when disposed at the other end of said frame means extending into dome recesses at opposite ends of the bottom wall of said freight container, and latch means mounted on said structure for entering said pocket means of said container to restrain the [altter] *latter* against vertical movement relative to said load supporting surface means.

18. In an apparatus for supporting a freight container having a bottom wall formed with dome recess means at opposite ends thereof and pocket means in an end wall thereof, the combination of a structure comprising load supporting surface means, and a pair of elongated parallel spaced apart frame members, a rotatable dome assembly mounted on said structure on an axis extending transversely of said frame members, a latch mounted on said dome assembly, said rotatable dome assembly having a first dome member extending above and below said supporting surface means in different rotative positions of said dome assembly, a sliding dome assembly extending transversely of said frame members, said sliding dome assembly having a second dome member extending above said frame members, means for mounting said sliding dome assembly for sliding movement relative to and between opposite ends of said frame members, said sliding dome assembly being adapted to be positioned on said frame members at one end thereof to overlie said rotatable dome assembly in the rotative position of the latter at which said first dome member extends below said supporting surface means, said first dome member in its position extending above said supporting surface means and said second dome member of said sliding dome assembly when disposed at the other end of said frame means extending into dome recesses at opposite ends of the bottom wall of said freight container to prevent movement of said container fore and aft and sidewise of said load supporting surface means, said first latch of said rotatable dome assembly being adapted to engage an edge portion of the bottom wall of the dome recess therein engageable with said first dome member, and a second latch mounted on said structure for entering said pocket means of said container, said second latch being adapted to restrain said freight container against vertical movement relative to said load supporting surface means.

19. In an apparatus of the class described the combination of a structure comprising load supporting surface means, and a pair of elongated parallel spaced apart frame members, a rotatable dome assembly mounted on said structure on an axis extending transversely of said frame members, said rotatable dome assembly having a first dome member extending above and below said supporting surface in different rotative positions of said dome assembly, a sliding dome assembly extending transversely of said frame members, said sliding dome assembly having a second dome member extending above said frame members, means for mounting said sliding dome assembly for sliding movement relative to said frame members, said sliding dome assembly being adapted to be positioned on said frame members to overlie said rotatable dome assembly in the rotative position of the latter at which said first dome member extends below said supporting surface means, and means for yieldingly retaining said sliding dome assembly in its position overlying said rotatable dome assembly.

*20. In an apparatus of the class described the combination of a structure having load supporting surface means, a dome assembly mounted on said structure comprising a dome member adapted to extend above said supporting surface means, a latch nose opening in said dome member, latch means pivotally mounted on said dome assembly for movement of a nose portion thereof inwardly and outwardly of said latch nose opening, means for yieldingly biasing said latch means with said portion thereof outwardly of said latch nose opening, and lock means including a rod member extending transversely of said dome member and having connection with said latch means for selectively locking said latch means in position with said nose portion thereof inwardly or outwardly of said latch nose opening in said dome member.*

*21. The apparatus of claim 20 comprising a crank arm connected to said rod member for rotating the latter for positioning said lock means with respect to said latch means to retain said nose portion inwardly or outwardly of said latch nose opening in said dome member.*

*22. The apparatus of claim 21 including means for yieldingly locking said lock means in selected positions with respect to said latch means.*

References Cited

The following references, cited by the Examiner, are of record in the patented file of this patent or the original patent.

UNITED STATES PATENTS

| | | | |
|---|---|---|---|
| 1,804,542 | 5/1931 | Perin | 296—35.10 |
| 2,543,295 | 2/1951 | McGregor et al. | 214—38.10 |
| 2,720,324 | 10/1955 | Cosentino | 214—38.44 |
| 2,786,590 | 3/1957 | Edwards et al. | 214—38.10 XR |
| 2,902,246 | 9/1959 | Lapsley | 248—361 |
| 2,942,912 | 6/1960 | Lucas et al. | 296—35.1 |
| 2,956,835 | 10/1960 | Rogers et al. | 296—35.1 |
| 3,111,341 | 11/1963 | Fujioka et al. | 296—35.1 |
| 3,193,238 | 7/1965 | Sherrie | 248—361 |
| 1,772,939 | 8/1930 | Fitch | 296—35.1 |
| 2,491,824 | 12/1949 | McKee | 214—38.10 |
| 2,876,016 | 3/1959 | McClellan | 296—35.1 |
| 3,107,020 | 10/1963 | Dempster et al. | 214—505 |

JOHN PETO, *Primary Examiner.*